United States Patent [19]
Yazaki et al.

[11] Patent Number: 5,774,807
[45] Date of Patent: Jun. 30, 1998

[54] METHOD FOR SEARCHING A CONTROL CHANNEL IN A MOBILE STATION

[75] Inventors: Hidetoshi Yazaki, Yokosuka; Kouji Chiba; Norihito Tokuhiro, both of Yokohama; Shigehide Sawayanagi; Kazufumi Yunoki, both of Yokosuka, all of Japan

[73] Assignee: NTT Mobile Communications Network Inc., Tokyo, Japan

[21] Appl. No.: 873,371

[22] Filed: Jun. 12, 1997

Related U.S. Application Data

[62] Division of Ser. No. 558,286, Nov. 13, 1995.

[30] Foreign Application Priority Data

Nov. 22, 1994 [JP] Japan .................................... 6-288366
Nov. 25, 1994 [JP] Japan .................................... 6-291333
Apr. 12, 1995 [JP] Japan .................................... 7-087023

[51] Int. Cl.[6] .............................. H04B 7/26; H04Q 7/02; H04Q 9/02
[52] U.S. Cl. .......................... 455/434; 455/144; 455/455
[58] Field of Search .................................. 455/414, 434, 455/455, 441

[56] References Cited

U.S. PATENT DOCUMENTS

| 5,109,390 | 4/1992 | Gilhousen | 455/434 |
| 5,119,397 | 6/1992 | Dahlin | 455/434 |
| 5,212,803 | 5/1993 | Uddenfeldt | 455/161.3 |
| 5,257,400 | 10/1993 | Yoshida | 455/434 |
| 5,396,645 | 3/1995 | Huff | 455/441 |
| 5,530,910 | 6/1996 | Taketsugu | 455/444 |

*Primary Examiner*—Howard Britton
*Attorney, Agent, or Firm*—Pollock, Vande Sande & Priddy

[57] ABSTRACT

A control channel is searched for call waiting in a mobile station where the power supply for a receiving circuit is turned off during a break time of receiving level measurements, wherein in a first control channel selection mode, all the control channels are divided into a plurality of groups, the receiving levels of the control channels are measured group by group intermittently and sequentially. The intermittent measurement of these groups are repeated until a control channel having a receiving level equal to or greater than a first predetermined value is detected. When a receiving level equal to or greater than the first predetermined value is detected, the receiving levels of all the control channels are measured in a second control channel selection mode.

8 Claims, 9 Drawing Sheets

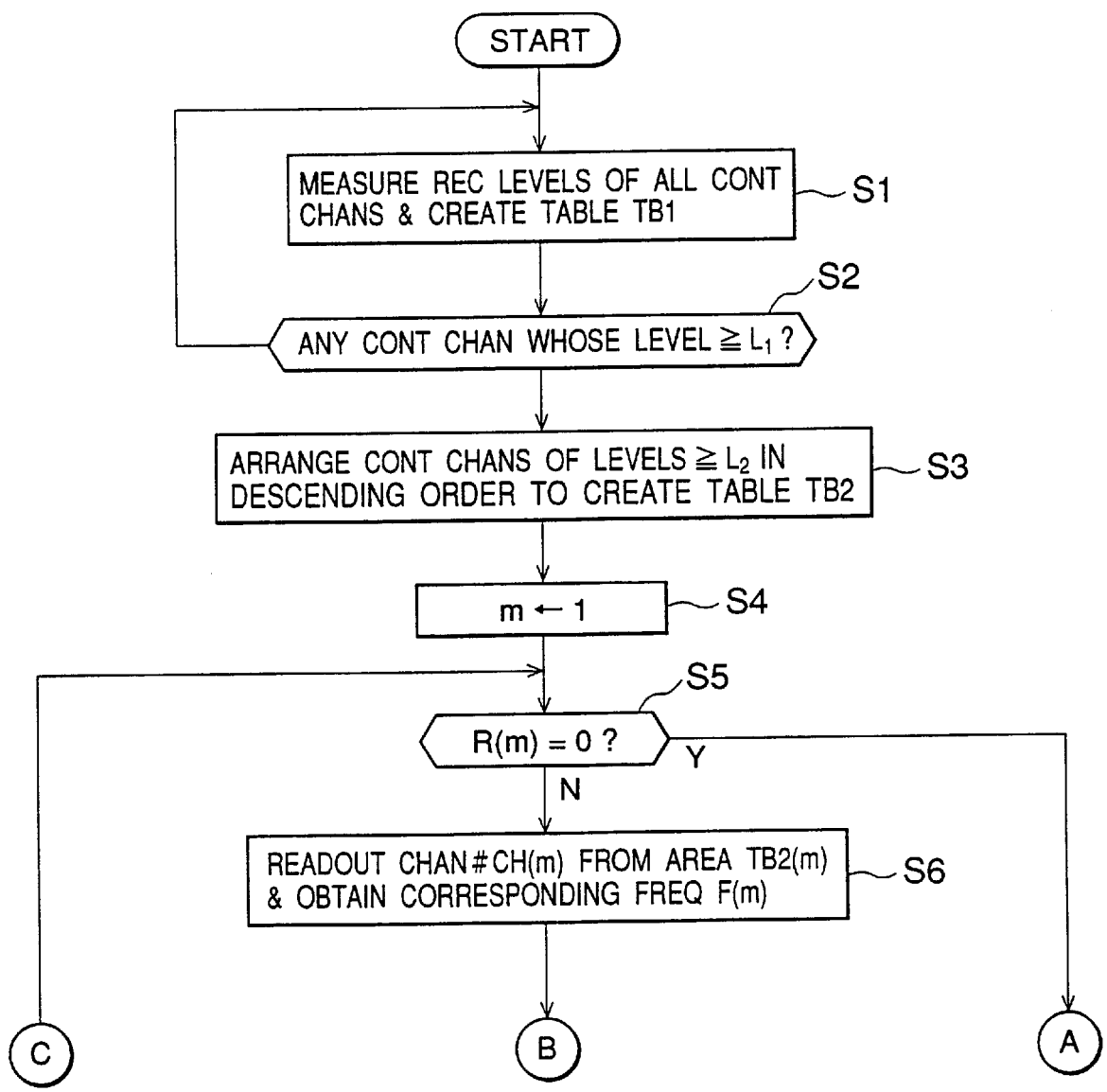

FIG. 6-b
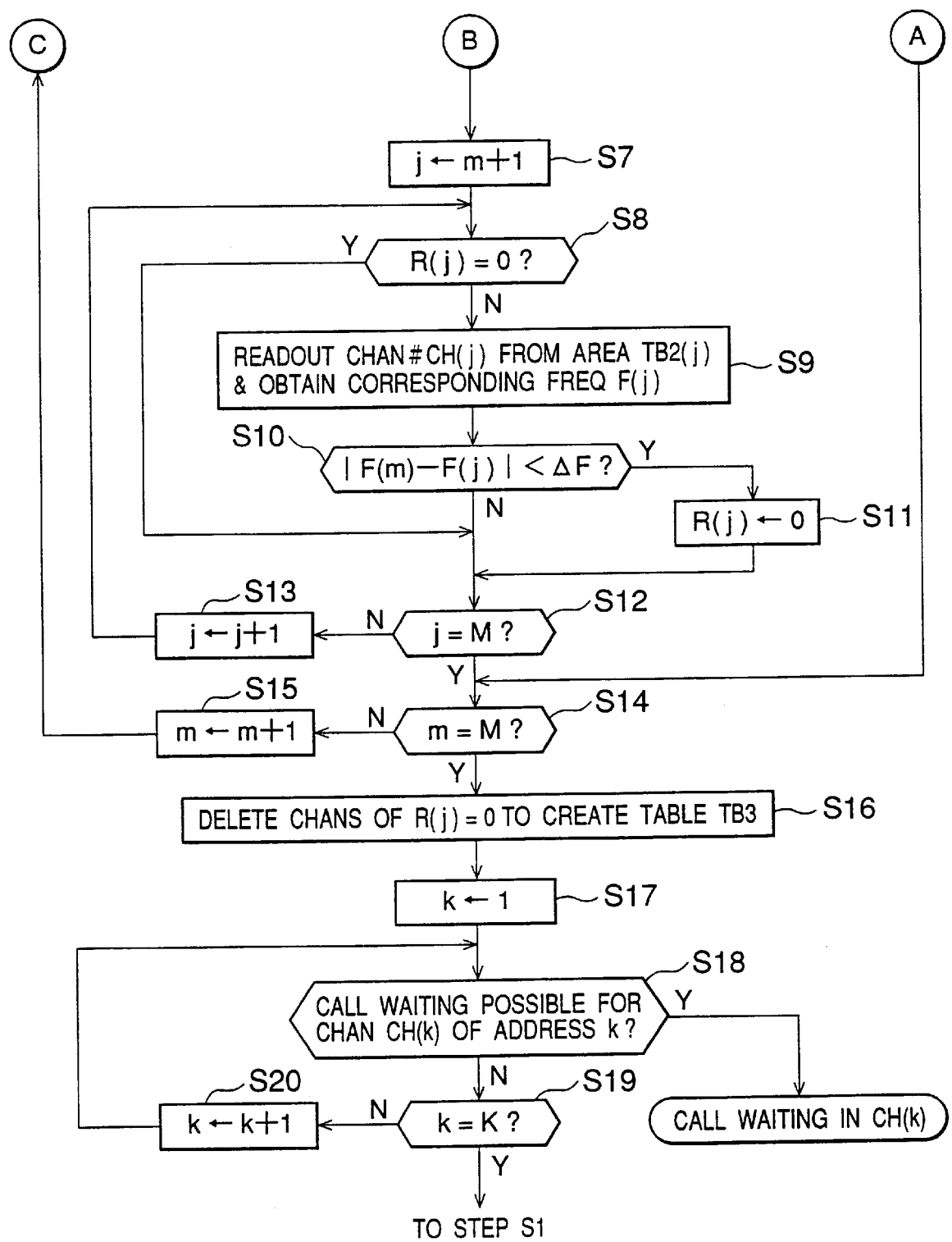

| m | CH(m) | R |
|---|---|---|
| 1 | CH1 | 15 |
| 2 | CH2 | 25 |
| 3 | CH3 | 5 |
| 4 | CH4 | 0 |
| 5 | CH5 | 50 |
| 6 | CH6 | 35 |
| 7 | CH7 | 17 |
| 8 | CH8 | 5 |
| 9 | CH9 | 0 |
| 10 | CH10 | 0 |
| 11 | CH11 | 18 |
| 12 | CH12 | 0 |
| 13 | CH13 | 19 |
| 14 | CH14 | 31 |
| 15 | CH15 | 12 |
| 16 | CH16 | 0 |
| 17 | CH17 | 0 |
| 18 | CH18 | 27 |
| 19 | CH19 | 10 |
| 20 | CH20 | 0 |

| m | CH(m) | R |
|---|---|---|
| 1 | CH5 | 50 |
| 2 | CH6 | 35 |
| 3 | CH14 | 31 |
| 4 | CH18 | 27 |
| 5 | CH2 | 25 |
| 6 | CH13 | 19 |
| 7 | CH11 | 18 |
| 8 | CH7 | 17 |
| 9 | CH1 | 15 |
| 10 | CH15 | 12 |
| 11 | CH19 | 10 |

| m | CH(m) | R |
|---|---|---|
| 1 | CH5 | 50 |
| 2 | CH6 | 0 |
| 3 | CH14 | 31 |
| 4 | CH18 | 27 |
| 5 | CH2 | 25 |
| 6 | CH13 | 0 |
| 7 | CH11 | 18 |
| 8 | CH7 | 17 |
| 9 | CH1 | 0 |
| 10 | CH15 | 0 |
| 11 | CH19 | 0 |

| m | CH(m) | R |
|---|---|---|
| 1 | CH5 | 50 |
| 2 | CH14 | 31 |
| 3 | CH18 | 27 |
| 4 | CH2 | 25 |
| 5 | CH11 | 18 |
| 6 | CH7 | 17 |

METHOD FOR SEARCHING A CONTROL CHANNEL IN A MOBILE STATION

This application is a divisional of U.S. patent application Ser. No. 08/558,286, filed Nov. 13, 1995.

The present invention relates to a method for searching a control channel in a mobile station for call waiting or cell switching, and particularly to such a search method which allows reduction of power consumption in the mobile station.

In a mobile communication system, as shown in FIG. 1, a wide service area SA is divided into many cells (sometimes referred to as zones) CE1, CE2, .... Mobile stations MS (car telephones, portable telephones etc.) in each cell can be connected to an exchange office (not shown) via a base station BS in the cell. The size of each cell and a transmission power of the associated base station are determined so that receiving levels of control channels transmitted from the base stations of adjacent cells are substantially equal to each other on the border of the adjacent cells. A control channel and a speech channel are assigned to each cell and the frequencies of the channels are different between the adjacent cells.

Information (control channel information) for identifying a base station in a cell and for identifying the base stations in the peripheral cells is always transmitted from the base station of the cell via a control channel allocated to the cell. The control channel is also used to send and receive information for processing the location registration of a mobile station, call-in and call-out. A communication channel is used by a mobile station for speech conversation. One or a plurality of speech channels are allocated to each cell dependent on the traffic volume of each cell. Since the present invention particularly relates to the control channel, only the control channel is explained hereinafter. A mobile station in each cell measures the receiving levels of the call waiting control channel of the cell and of the control channels of the peripheral cells. When the receiving level of the call waiting control channel becomes a predetermined level or more lower than the highest one of the receiving levels of the control channels of the peripheral cells, it is decided that the mobile station is moving into another cell, and a processing for call-waiting is performed with the control channel of the highest receiving level.

Since the frequency band allocated to the entire communication system is limited, the total number N of the control channels obtainable at intervals of a constant band width ΔF is limited. Since different frequencies cannot be allocated to all the cells, the same set of channels, for example CH1-CHM, are repeatedly allocated to different groups of the cells sufficiently far from one another so that the interference can be ignored. Further, in order to efficiently utilize the frequency band allocated to mobile communications, control channels CH1'-CHM' shown in row B of FIG. 2 whose frequencies are displaced by a frequency smaller than the control channel interval (band width) ΔF, e.g. ΔF/2, respectively from the frequencies of the control channels CH1-CHM shown in row A of FIG. 2 in a interleaving manner may be allocated to the cells such that radio-waves of control channels whose frequencies are displaced by ΔF/2 do not interfere each other. Therefore, if M'=M, a maximum of 2M control channels can be used in the entire service area and the receiving circuit of each mobile station is constructed to be capable of selecting any one of these control channels for the communication.

The number of total control channels is defined as N hereinafter. For a mobile station in any cell, the control channel being transmitted by a base station of the cell in which the mobile station is located is the call waiting control channel in that cell and a control channel whose frequency is displaced by ΔF/2 from the call waiting channel is unnecessary channel. Therefore, in an arbitrary cell where a mobile station is located, a control channel of another cell whose frequency is displaced by ΔF/2 from the control channel being transmitted by the base station of the arbitrary cell is referred to as an interleave channel hereinafter.

After the power is turned on in a mobile station, in order to be ready for a call-in and a call-out, it is necessary to find out a control channel being transmitted by a base station of a cell where the mobile station is located and to be in the receiving state (call waiting state) of that control channel. It is also necessary to perform procedures for entering the call waiting state when a mobile station gets out of a tunnel or a mountain cove, where a control channel cannot be received, after a long stay therein or when enters the service area from the outside area. In such a case, a mobile station selects an appropriate control channel from all the control channels and waits for the receipt of a control signal related to the communication control from the selected control channel.

In the conventional system, when a mobile station is powered on and the first call waiting process is performed, or when a mobile station gets out of incapable state of signal reception and the first call waiting process is performed, channels whose receiving levels are greater than a predetermined level defined by the system are selected as candidates and a decision on whether call waiting possible or not is performed starting from the highest receiving level channel in the descending order of the receiving level for all the candidate channels. That is, first, the mobile station selects a control channel candidate of the highest receiving level and tries to receive the control signal. If the control signal can normally be received and call waiting is deemed to be possible as a result of analysis of the contents of the received control signals, a call waiting is performed with the control channel. However, if the control signal cannot normally be received over the selected control channel, or if the analysis of the control signal indicates that the control channel cannot be used even though the control signal can normally be received, a decision on propriety for call waiting is tried with the next highest receiving level control channel (next candidate). The conditions by which call waiting is decided to be impossible are the cases where the signal received over the control channel indicates "out of service" due to under construction or under testing, or the received signal is not the control signal used in the communication system by which the mobile station is served, or the level of the received control signal is below the predetermined level, etc.

The aforementioned decision on propriety for call waiting is performed until a control channel by which call waiting is possible is found in the candidate control channels. If all the candidate control channels are decided to be unable for call waiting, the receiving levels of all the control channels are measured again to obtain the candidate control channels.

As mentioned above, in a mobile station, since the receiving level measurements are repeatedly performed until a control channel whose receiving level is equal to or greater than a predetermined value is found, the receiving levels of all the control channels are measured repeatedly and continuously even when the mobile station is located outside of the service area SA. Thus, a problem of an early battery exhaustion does exist in a portable mobile station etc..

In a mobile communication system where interleave channels are provided, as mentioned previously with reference to FIG. 2, with respect to each control channel there are two adjacent interleave control channels having frequencies within an interval (e.g., interval of ΔF/2) less than the control channel frequency band width ΔF, and the frequency band of each control channel party overlaps such two interleave control channels. Assuming that such two interleave control channels whose frequency bands are adjacent to a control channel CHa (row A of FIG. 2) are CHb and CHc (row B of FIG. 2), if the receiving level in the control channel CHa is equal to or greater than a predetermined value in a cell, it is possible that the receiving levels in the adjacent control channels CHb and CHc may also be equal to or greater than the predetermined value because of the partial band overlap with the control channel CHa.

In a cell CEa (FIG. 1), for example, there may be a case when a mobile station MS which is in the call waiting state with the control channel CHa enters a cove of buildings or a tunnel and is temporarily unable to receive the control signals, and then the mobile station selects the interleave channels CHb and CHc as the candidate control channels in order to search the call waiting channel again and decides propriety for call waiting. In addition, when the control signal received by the mobile station MS over the control channel CHa which is selected for call waiting in the cell CEa is the signal indicating "under construction" or "under test" of the base station and thus the control channel cannot be used, similar decision on propriety for call waiting may be performed on the interleave channel CHb or CHc as an alternative candidate control channel for CHa. In such a case, the receiving level in the candidate control channel CHb or CHc selected by the receiving circuit of the mobile station may not be the receiving level of the control signal from the base station of other cell CEb or CEc where the control channel CHb or CHc is allocated but may be the receiving level of the control signal of the control channel CHa whose frequency band is partially overlapped with that of CHb or CHc.

In this case, even if the receiving level is sufficient to satisfy the predetermined level for call waiting, the decision of propriety for call waiting always fails because the control signal cannot normally be received and the contents cannot be analyzed. Since it usually takes several seconds to judge propriety for call waiting for one control channel, if there are many candidate control channels which need decisions for call waiting, it takes a long time to determine the call waiting channel and a large power is consumed.

As described above, a mobile station possibly performs decision of propriety for call waiting on the interleave channels CHb and CHc which are unable to be call waiting and thus, it takes time to detect control channels in which the mobile station can be in call waiting state. In addition, when the mobile station is a portable mobile station, the battery consumption is accelerated.

Once a mobile station enters call waiting state, the mobile station waits for a control signal such as a call-in signal from the base station over the control channel in the cell where the mobile station is located and also the mobile station always measures the receiving levels of the control channels of the peripheral cells surrounding the cell where the mobile station is located and the receiving level of the call waiting control channel continuously and repeatedly based on the identification information of peripheral cells' control channels contained in the received control signal. For example, as shown in FIG. 10A to be mentioned later, when a series of receiving levels of the call waiting control channel and the control channels of the peripheral cells are measured in each measuring time $T_M$, the measurement of receiving levels of these control channels is immediately repeated again. For each constant time period $T_S$ (or constant number of repetitions), an average value of the measured receiving levels in the constant time period $T_S$ is obtained for each channel. The average receiving level of the call waiting control channel is compared with the average receiving level of each peripheral cell's control channel. If any one of the latter is equal to or greater than the sum of the call waiting channel's level and a predetermined value ΔL, the process shifts to the procedures for switching to the cell corresponding to the highest level control channel of those peripheral control channels. That is, for each time period $T_S$, the process of the averaging the receiving levels is performed for each of the control channels and thus obtained average receiving levels are compared to decide whether processing for cell switching is necessary.

In the conventional system, regardless of the fading period of the receiving level or the moving speed of a mobile station, the receiving levels of the call waiting control channel and the peripheral cells' control channels are measured in a constant period $T_P$. When the measurement of all the receiving levels of the control channels to be measured is completed, it is usual to repeat, immediately, the measurement from the starting control channel. That is, the measurement repetition period $T_P$ is equal to the measuring time $T_M$ required for measuring, once, all the control channels to be measured. When the moving speed of the mobile station is high, rapid change in the receiving levels of the call-waiting channel and peripheral cell channels are likely to occur and, therefore, it is necessary to make the measuring period $T_P$ and call-switching decision period $T_S$ as short as possible. On the other hand, despite that rapid change might hardly occur in the receiving level when the moving speed is low, it has been conventional to repeat the receiving level measurement and the cell-switching decision with the same short periods $T_P$ and $T_S$ as those in the case of the high moving speed mentioned above, thus consuming undesirably large power.

In addition, in the conventional system, since the period $T_S$ for deciding the cell switching is constant, the cell switching decision sometimes has to be made based on unreliable measurement results caused by temporary reduction in receiving level in a cove of buildings etc. Hence, it has been frequent to perform processing for the cell switching, in vain. Therefore, much useless power has been consumed.

SUMMARY OF THE INVENTION

It is a first object of the present invention to provide a method for searching, with a less power consumption, control channels which can be candidates for a call-waiting control channel.

It is a second object of the present invention to provide a method for searching, with less power consumption, a call-waiting control channel among the candidates for call-waiting control channels.

It is a third object of the present invention to provide a method for searching, with a less power consumption, a control channel for a cell switching decision during call waiting time in a mobile station.

According to a first aspect of the present invention, when a mobile station selects candidate control channels for call waiting, in a first control channel selection mode, a plurality of control channels which are part of all the control channels stored in a mobile station are sequentially and intermittently measured until a control channel whose receiving level is equal to or greater than a predetermined value is detected. As the result, if any control channel whose receiving level is equal to or greater than the predetermined value is detected, then in a second control mode selection mode, the receiving levels of all the control channels stored in the mobile station are measured to select an optimum control channel in the cell. If the optimum control channel cannot be selected in the second control channel selection mode, the first control channel selection mode is performed again.

In the aforementioned first aspect of the present invention, in the first control channel selection mode, a plurality of control channels are divided into a plurality of groups, receiving levels of the control channels are measured group by group intermittently and sequentially.

According to a second aspect of the present invention, in the method for selecting a control channel for call waiting, when the frequency interval between arbitrary two selected control channels is less than a channel frequency interval and the receiving levels of these control channels are equal to or greater than a predetermined value, only the control channel whose receiving level is higher is defined as the subject of selection for a call waiting control channel and the control channel whose receiving level is lower is excluded from the subject of selection for a call waiting control channel.

According to a third aspect of the present invention, the fading frequency of the receiving level of a call waiting control channel or the moving speed of a mobile station is detected. If the detected fading frequency or the moving speed is less than a predetermined value, the receiving level measurement repetition period is made longer than the case where the detected value is equal to or greater than the predetermined value.

In the above third aspect of the present invention, if the fading frequency is lower than the predetermined value, the repetition period of the cell switching decision is also made longer than the case where the fading frequency is equal to or higher than the predetermined value.

BRIEF DESCRIPTION OF THE DRAWINGS

FIG. 6 is a flow chart for implementing the control channel searching method in accordance with the second aspect of the present invention;

FIG. 7A is a first table TB1 generated in the method of FIG. 6;

FIG. 7B is a second table TB2 generated in the method of FIG. 6;

FIG. 7C is a table TB2' created by setting the receiving levels of the interleave channels to zero in the table TB2 of FIG. 7B;

FIG. 7D is a third table TB3 created by deleting channels whose receiving levels are zero from the table TB2' of FIG. 7C;

DETAIL DESCRIPTION OF PREFERRED EMBODIMENTS

Figure 1:
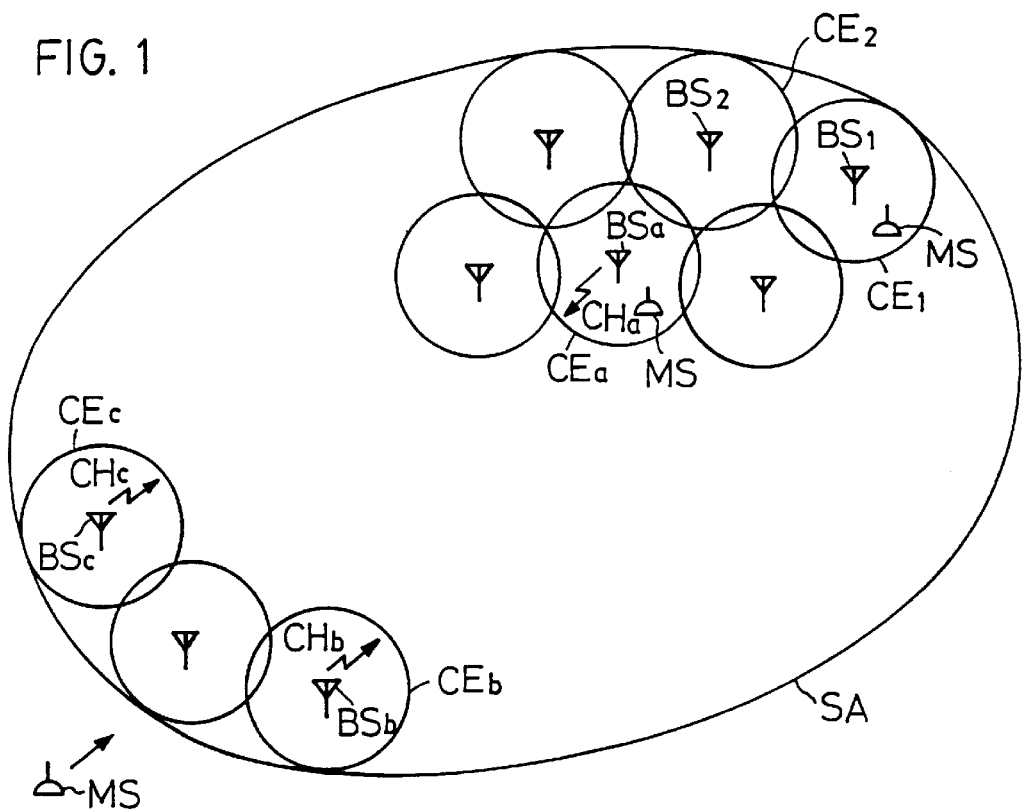
FIG. 1 shows an outline of the service area in the conventional mobile communication system.

The embodiments of the present invention will be explained below referring to the drawings.

Figure 3:
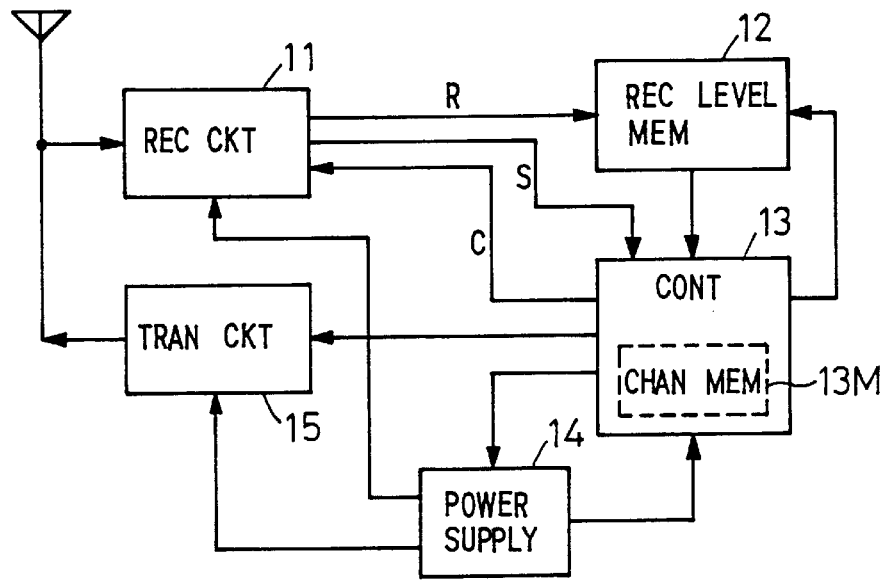
FIG. 3 is a block diagram showing a basic configuration of a mobile station where the method in accordance with the first and second aspects of the present invention is applied.

FIG. 3 shows a basic configuration of a mobile station for implementing the method in accordance with the first and second aspects of the present invention which is to be explained below. A mobile station has a receiving circuit 11, a receiving level memory 12, a control part 13, a power supply part 14 and a transmission circuit 15. The control part 13 has a channel memory 13 internally and the frequencies corresponding to all the control channels usable in the service area are initially stored in the channel memory 13. The receiving circuit 11 and the transmission circuit 15 are set to a desired channel by setting a frequency read out from the channel memory 13 to the receiving circuit 11 and the transmission circuit 15. The receiving circuit 11 gets into receiving state in the set control channel, measures the level R of the control signal being received, writes the level R into the receiving level memory 12 and gives the received control signal S to the control part 13. The control part 13 compares the receiving levels of the control channels read out from the receiving level memory 12 as required with a first predetermined value $L_1$ to select candidate control channels and to decide if the selected candidate control channels are equal to or greater than a second predetermined value $L_2$. Also, the control part 13 decides if the received control signal S is a proper control signal and, based on these decision results, further decides if any one of the selected candidate control channels is the right control channel for call waiting the control part 13 further controls the power supply part 14 to turn off the power to the receiving circuit 11 while the measurement of receiving levels is not performed and to turn off the power to the transmission circuit 15 while transmission is not performed.

Embodiment According To The First Aspect

For example, when a mobile station is located outside of the service area, if the receiving level of the control channel is less than the predetermined level, signals cannot be received normally. Therefore, continuous monitoring of all the control channels for searching a call waiting control channel is meaningless. On the other hand, when the mobile station is close to the service area, it is desired that a call waiting control channel can be found immediately. Therefore, in the embodiment of the first aspect, after detecting that the mobile station is close to the service area in the first control channel selection mode SM1, the call waiting control channel searching is performed in the second control channel selection mode SM2 in the same manner as the conventional system.

Figure 2:
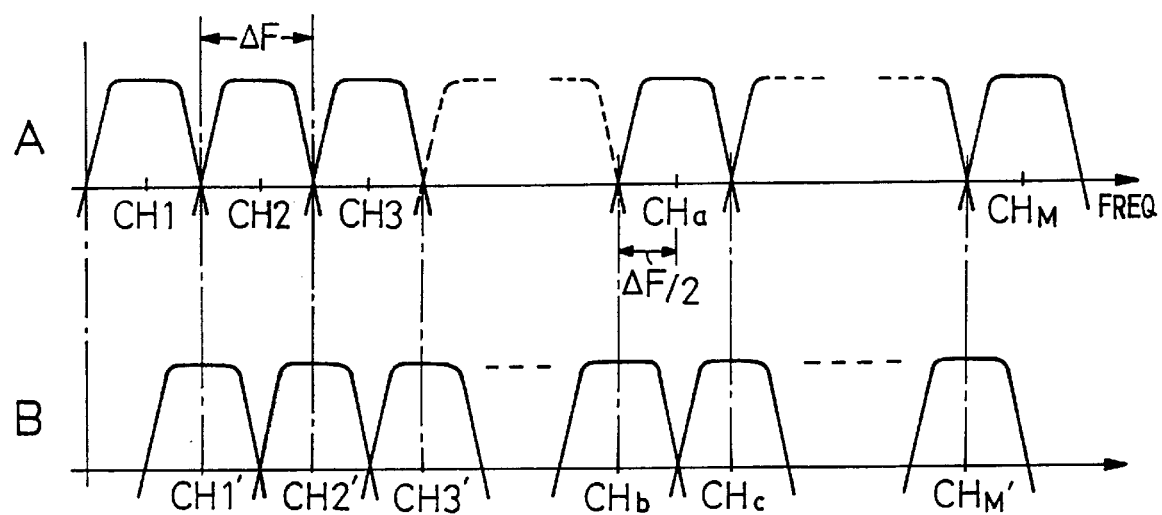
FIG. 2 shows a frequency arrangement of all the control channels in a service area.

Even in the case when interleave channels are not used, the skirts of adjacent frequency bands of the control channels are overlapped as shown in row A of FIG. 2. For example, when a receiving level of either of the control channels (e.g., CH1 or CH3) adjacent to a control channel (e.g., CH2) of a certain cell is measured in that cell, a leaked power from the control channel CH2 is detected. Therefore, even if the receiving levels of all the control channels which have been installed in the mobile station are not measured, the signals of any one of the control channels from the service area can possibly be detected and it can possibly be detected that the mobile station is approaching to the service area. For example, in row A of FIG. 2, if the total number of control channels is 9 and those channels are CH1, CH2 . . . CH9 in ascending order of frequency, it can be judged whether or not there is a control channel signal wave in any one of the channels CH1–CH9 by measuring the receiving levels of only three channels CH2, CH5 and CH8. From this reason, it is highly probable that the receiving level equal to or greater than the predetermined value $L_1$ can be detected in either case where a control channel of a cell in the approached service area matches the control channel which the mobile station selects or is a adjacent control channel of the control channel which the mobile station selects.

According to the first aspect of the invention, at least one group of plurality of control channels selected from all the control channels which a mobile station can set are predetermined. The measurements of receiving levels on the groups of control channels are repeatedly performed intermittently. When a receiving level equal to or greater than the predetermined value $L_1$ is detected in any of the control channels, it is judged that the mobile station is close to the service area. The power consumption in the receiving circuit can be reduced by such intermittent operations.

Figure 4:
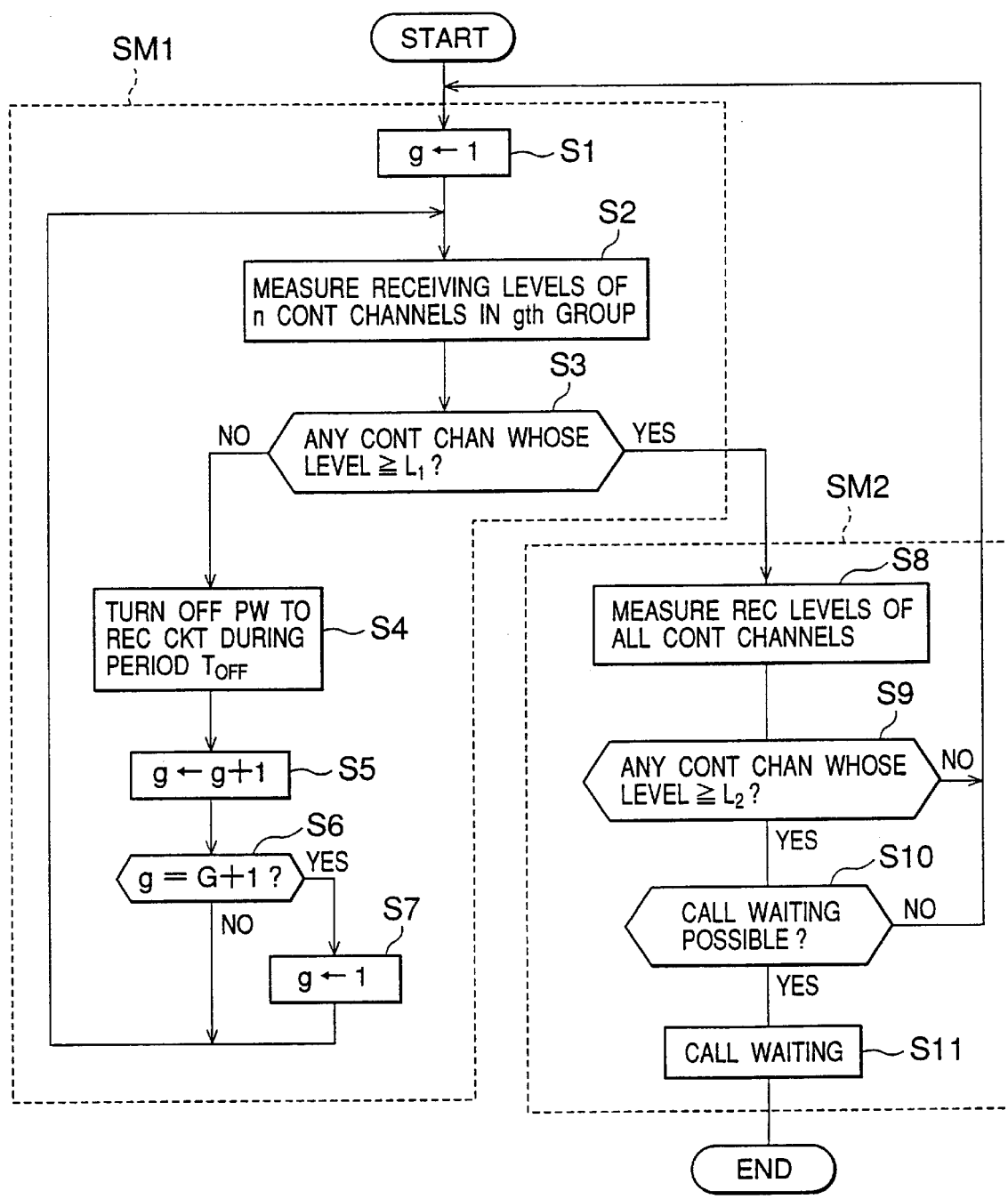
FIG. 4 is a flow chart for implementing the control channel searching method in accordance with the first aspect of the present invention.

FIG. 4 shows a flow chart for implementing the control channel searching method in accordance with the first aspect of the present invention. According to the embodiment of the first aspect, in the first control channel selection mode SM1, all the, e.g. N, control channels CH1, CH2 . . . CHN pre-stored in the channel memory 13M of a mobile station are divided into a plurality of, e.g. G, groups. Each of the groups are intermittently and sequentially selected to measure the receiving levels. Dependent on the received level (whether or not the received level is equal to or greater than the predetermined value $L_1$), it is determined that the mobile station is approaching to the service area, i.e., to any one of the cells. Therefore, even if a control channel having a receiving level equal to or greater than the predetermined value $L_1$ is not detected in one group, it is highly possible that such a control channel can be detected in the other groups.

Incidentally, an arbitrary grouping is possible, for example, as shown in following patterns 1, 2 and 3. Here, for explanation purposes, a case where the total number of control channels is 50 and the number of groups is 10 (G=10) is shown.

Pattern 1
First group =CH1, CH2, . . . , CH5
Second group =CH6, CH7, . . . , CH10
 :
Tenth group =CH46, CH47, . . . , CH50
Pattern 2
First group =CH1, CH11, . . . , CH41
Second group =CH2, CH12, . . . , CH42
 :
Tenth group =CH10, CH20, . . . , CH50
Pattern 3
Channels are randomly allocated to First group—Tenth group.

Incidentally, a method other than the above patterns 1–3 is of course possible.

The grouping will be explained in accordance with the sequence shown in FIG. 4. In FIG. 4, G is the number of groups, g is the group number (g=1 through G), N is the number of control channels stored in a mobile station and n is the number of control channels per group (n=N/G).

In FIG. 4, a variable g is set to 1 first in order to specify a group (step S1). Then in step S2, n control channels are selected in the gth group (first group) specified by this variable g and the receiving levels of those channels are measured (step S2). In the above pattern 1, the receiving levels of 5 waves of the control channels CH1, CH2, . . . , CH5 are measured.

As the result of this receiving level measurement, it is decided whether or not the control channel having receiving level equal to or greater than the first predetermined value $L_1$ does exist (step S3). The first predetermined value $L_1$ is set to relatively small value (e.g., 4–7 dBμ) so that it would be possible to detect, in a control channel, a leakage power from the adjacent rightous call-waiting control channel to thereby decide that the mobile station is located inside the service area. As the result of this judgement, if any control channel having a receiving level equal to or greater than the first predetermined value $L_1$ is not detected, the process proceeds to step S4 to turn off the power of the receiving circuit 11 for a predetermined time period $T_{OFF}$. After the predetermined time period $T_{OFF}$ has passed, the variable g is incremented by one in step S5 and then g is checked to see if g=G+1. If g is not G+1, the process returns to step S2 to select the control channels of the next group g+1 determined in step S5. In the current case, control channels of the second group are selected.

In such a way, when the process returns to step S2 to select next group, as in the aforementioned manner, the receiving level of each control channel in the selected group g is measured and it is checked if a control channel having a receiving level equal to or greater than the predetermined value $L_1$ exists based on the received levels. The loop process of steps S2–S7 is repeated until a control channel having a receiving level equal to or greater than the first predetermined value $L_1$ is detected. Incidentally, if g is G+1 in step S6, the variable g is reset to 1 in step S7 to return to the first group.

In step S3, if a control channel having a receiving level equal to or greater than the first predetermined value $L_1$ is detected as the result of the receiving level measurement mentioned above, it is judged that the mobile station is approaching to the service area. Then, the process proceeds to the second control channel selection mode SM2 described in step S8 and after.

In the first step S8 in the second control channel selection mode SM2, the receiving levels of all the N control channels CH1-CHN prestored in the channel memory 13M of the mobile station are measured. Then, each of the measured levels of all the control channels is checked to see if any one of the levels is equal to or greater than the second predetermined value $L_2$ (step S9). If control channels having receiving levels equal to or greater than the second predetermined value $L_2$ are detected, each of these control channels is checked from the highest level control channel in descending order to see if any one of these control channels can be the call waiting control channel (step S10). The predetermined value $L_2$ is a reference value to be compared with to determine whether processing for call-waiting can be performed or not with the selected control channel, and is selected to be equal to or greater than $L_1$, for example to 8–10 dB$\mu$. The decision on propriety for the call waiting is performed by receiving the control signal on the selected control channel and then by judging if the mobile station can receive and send a call over the control channel. The method of this decision is the same as mentioned above.

If it is decided that call waiting is possible in this decision of propriety for call waiting, a call waiting or a call sending is performed on the control channel (step S11).

When any control channel having the receiving level equal to or greater than the second predetermined value $L_2$ is not detected in the step S9, or when all the detected control channels are not qualified for call waiting in the decision of propriety for call waiting in step S10 even if the control channels having the receiving levels equal to or greater than the second predetermined $L_2$ are detected, the process returns to the first step S1 to move to the first control channel selection mode SM1 again and a forecast for the service area is performed.

Figure 5A:
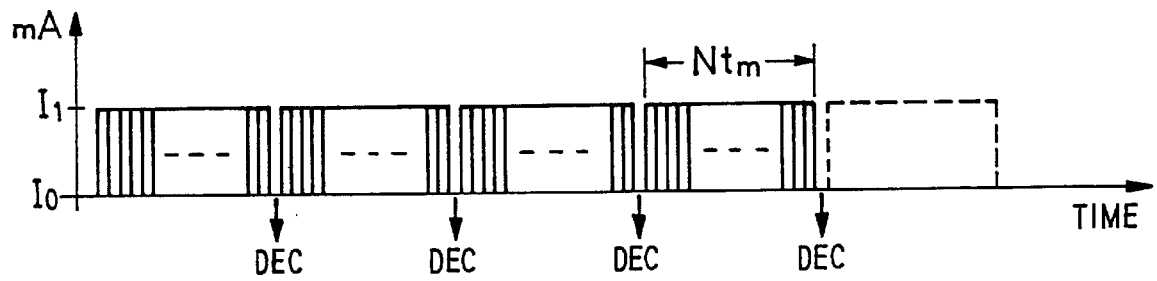
FIG. 5A is an operation timing chart in the conventional control channel searching method.
Figure 5B:
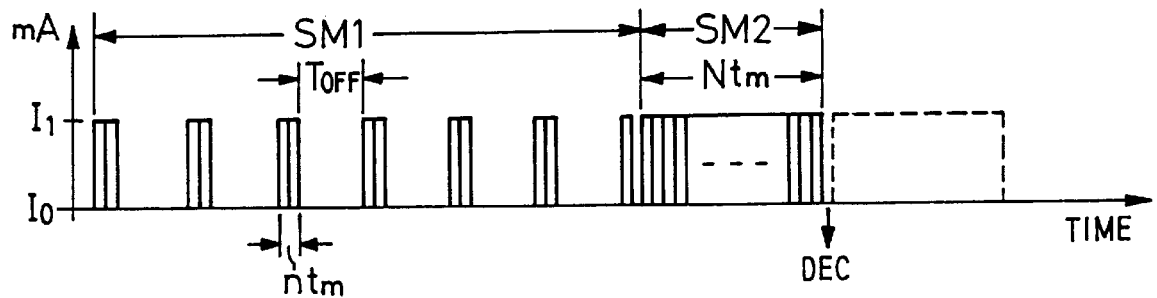
FIG. 5B is an operation timing chart in the method of FIG. 4.

Next, the effect of the embodiment performing the intermittent operations in accordance with the first aspect will be explained referring to FIGS. 5A and 5B. FIG. 5A is a timing diagram showing the operation of the conventional control channel searching method and FIG. 5B is a timing diagram showing the intermitted operation of the control channel searching method in accordance with the first aspect of the present invention. Incidentally, in FIGS. 5A and 5B, N is the number of all the control channels prestored in a mobile station, $T_{OFF}$ is the time duration where the power of the receiving circuit is off, n is the number of control channels per group (n=N/G), G is the number of groups (G=1 through N groups), $t_m$ is time required for measuring the receiving level per channel, $I_1$ is the consumed current value during the receiving level measurement and $I_0$ is the consumed current value when the power of the receiving circuit is off.

As shown in FIG. 5A, in the conventional control channel searching method, the control channels having receiving levels equal to or greater than the predetermined value are detected for every receiving level measurement of all the control channels and then the decision of propriety for call waiting is performed on those detected control channels. Therefore, the power of the receiving circuit is always on. The average value $I_{AV}$ of the consumed current until a call waiting control channel is determined is $I_1$ mA. On the other hand, in the control channel searching method of the present invention, since the operation is intermittent in the first selection mode until the service area is detected as shown in FIG. 5B, if the time period of the second selection mode SM2 is shorter enough to be ignored than the time period of the first selection mode SM1, the average value $I_{AV}$ of the consumed current until a call waiting control channel is determined is expressed as below.

$$I_{AV} = \{(n \times t_m) \times I_1 + T_{OFF} \times I_0\} / (n \times t_m + T_{OFF})$$

In order to further clarify the effect of the present invention, if $I_0$=10 mA, $I_1$=100 mA, $T_{OFF}$ is 1 second, n=5 (N=50, G=10) and $t_m$=10 ms are assumed, the average consumed current in the conventional method is $I_{AV}$=100 mA and the average consumed current in the method of the present invention is $I_{AV}$=18 mA. Thus, it is appreciated that the consumed current in the method of the present invention is considerably reduced.

In the embodiment mentioned above, although an example where a mobile station is approaching to the service area, in a place where the control channel cannot be received, such as a tunnel, under ground and a building, the first control channel selection mode SM1 is performed repeatedly under the control of the mobile station, and thus, the power supply to the receiving circuit is periodically turned off for a predetermined time period $T_{OFF}$ to reduce the consumed current.

Embodiment According To The Second Aspect

Next, an embodiment according to the second aspect of the present invention will be explained below. As described above, in the case where a mobile station is entering the service area or a mobile station is exiting -.from a state incapable of receiving a control channel in the service area, a call waiting control channel is newly selected from all the control channels. In such a selection of a call waiting control channel, if interleave channels are used in the mobile communication system, in this embodiment, the interleave channels are excluded from the control channels whose receiving levels are equal to or greater than the predetermined value $L_1$ selected from all the control channels. The decision of propriety for call waiting is performed only for the remaining control channels to reduce the number of measurements of the receiving levels and to reduce the power consumption.

In this embodiment of the second aspect of the present invention, when searching a call waiting control channel, a received signal on the selected control channel is checked to see if the selected control channel is interleave channel based on the frequency information of the control channel and the receiving level. The control channel which is judged as an interleave channel is not treated as a candidate control channel for call waiting and the propriety for call waiting is not decided on the control channel. The process flow is shown in FIG. 6 and is explained below referring to the specific examples in FIGS. 7A–7D. However, the operation examples explained here are based on the conditions below.

(a) Total number of the control channels which can be preset in a mobile station is 20 and those control channels are CH1–CH20.

(b) Assuming that the frequency of channel CHn is Fn and $\delta$ is a positive value less than the channel frequency interval $\Delta F$, a frequency interval between the adjacent channels in these 20 channels is less than the channel frequency interval $\Delta F$ as shown below.

$$F2 = F1 + \delta$$
$$F3 = F2 + \delta$$
$$F4 = F3 + \delta$$
$$\vdots$$
$$F20 = F19 + \delta$$

(c) The predetermined value of the receiving level for allowing call waiting is 10 db$\mu$, for example.

First, in step $S_1$, the mobile station refers to the frequency information of all the control channels CH1–CH20 prestored in the channel memory of the mobile station for call waiting and measures the receiving levels R of those control channels. Each receiving level R of each control channel obtained in this measurement is stored in the table TB1 (FIG. 7A) provided in the receiving level memory 12 (FIG. 3).

Then in step S2, it is decided whether or not there are control channels whose receiving levels are equal to or greater than the predetermined value $L_1$ referring to each receiving level stored in the table TB1. If there is no control channel having a receiving level equal to or greater than the predetermined value $L_1$, then the process returns to step S1 to start the measurement of the receiving levels of all the control channels again.

In step S3, if it is decided in step S2 that there is at least one control channel having a receiving level equal to or greater than the predetermined value $L_1$, the receiving levels equal to or greater than the predetermined value $L_1$ are extracted from the receiving levels of the control channels stored in the table TB1 and sorted in descending order. Each set of a control channel number and its receiving level obtained in such a way is stored in the candidate table TB2 (FIG. 7B) provided in the receiving level memory 12. In the candidate table TB2 of FIG. 7B, the receiving levels R equal to or greater than the predetermined value $L_1$ extracted from the table TB1 of FIG. 7A are sorted in descending order.

Based on the candidate table TB2 created in such a manner, the relationship between the frequencies of the control channels is analyzed starting from the control channel of highest receiving level in descending order (i.e., starting from the highest receiving level control channel sequentially in the candidate table TB2). If the interval between compared frequencies of the two control channels is less than the channel frequency interval ΔF, the channel having lower receiving level is presumed as an interleave channel and deleted from the candidate control channels. The details of the deletion process are as follows.

First, a variable m is set to 1 in step 4. Then, referring to the mth (=1st) storage area TB2(m) of the candidate table TB2 in step 5, the receiving level R(m) of the control channel stored in the storage area TB2(m) is read out to check to see if R(m)=0. If R(m)=0, then the process goes to step S14 skipping the processes S6–S13. If R(m) is not zero, the process proceeds to step S6. In the example of TB2 of FIG. 7B, the receiving level R(1)=50 of channel CH5 is read out and then the process proceeds to step S6.

In step S6, the control channel number CH(m) of the area TB2(m) is read out and the corresponding frequency F(m) is read out from the channel memory 13M (FIG.3). In this example, the frequency $F_5$ of the channel number CH5 is read out.

Then, in step S7, a variable j=m+1 is set. In step S8, a receiving level R(j) of the control channel of the area TB2(j) is read out to check to see if R(j)=0. If R(j) is zero, the process immediately skips to step S12. If R(j) is not zero, jth storage area TB2(j) in the candidate table TB2 is referred to read out the channel number CH(j) stored in this area TB2(j) and then the corresponding frequency F(j) is obtained from the channel memory 13M. In step S10, the difference between the two frequencies F(m) and F(j) is checked to see if the difference is less than the control channel interval ΔF. If the difference is less than the control channel interval ΔF, in step S11, receiving level R(j) of channel CH(j) is compulsorily set to the value less than the predetermined value 10 dBt, e.g. 0 (refer to table TB2' of FIG. 7C). If the difference is not less than ΔF, the process moves to step S12. By this process, the frequency difference |F5–F6| between the channel CH5 and the channel CH6 having next largest level in the table TB2 is obtained. Since this difference is less than ΔF from aforementioned conditions, the process proceeds to step S11 and the receiving level R(6) of the channel CH6 is set to 0.

In step S12, j is checked to see if j is M. If j is not M, j is incremented by 1 in step S13 and the process returns to step S7 to repeat steps S8–S13 until j becomes M. When j becomes M, in step S14, m is checked to see if m is M. If m is not M, m is incremented by 1 in step S15 and the process returns to step S5 to repeat steps S5–S15 until m becomes M. By this process, for example, regarding the channel CH14, the receiving levels R(13) and R(15) of the respective channels CH13 and CH15 whose frequency intervals relative to the channel CH14 are less than ΔF and whose receiving levels R(13) and R(15) are less than the channel CH14, are also set to 0. In such a way the table TB2' of FIG. 7C is obtained.

When m becomes M, in step S16, a table TB3 (FIG. 7D) is obtained by deleting all the channels having receiving levels of zero (R=0) from the table TB2'. In the table TB3, the data are also sorted in descending order starting from the highest receiving level. The number of control channels stored in the table TB3 at this time is K.

In step S17, a variable k is set to 1. In step S18, the channel number CH(k) of the area TB3(k) of the table TB3 is read out and this control channel is set to the receiving circuit to perform the receiving operation and to decide the propriety for call waiting. That is, it is checked to see if the receiving level of the channel CH(k) is equal to or higher than the predetermined value, if the control signal can normally be received, if the analysis of the control signal indicates the contents defining conditions for call waiting and the mobile station can satisfy the conditions for call waiting, and if the control signal is not of a control signal inhibiting the use of the control channel. If call waiting is not possible, k is checked to see if k is M in step S19. If k is not M, k is incremented by 1 in step S20 and the process returns to step S18 to repeat the same processes.

If the control channel set in step S18 is decided that the control channel can be a call waiting channel, the call waiting state is started. If k is K in step S19, that is, any one of the control channels in the table TB3 is not qualified as a call waiting control channel, the process returns to step S1 to start the measurement of the receiving levels of all the control channels again. In such a way, the candidate control channels in the table TB3 of FIG. 7D are checked sequentially in descending order starting from the highest level control channel to see if these are capable for call waiting.

As mentioned above, according to the embodiment of the second aspect of the present invention, the number of decisions of propriety for call waiting can be reduced and the time up to the start of a call waiting can be shortened. Also, the battery consumption in a mobile station can be reduced by the reduced number of decisions of propriety for call waiting. It is obvious that the method of this second aspect may also be applied to the second control channel selection mode in the aforementioned method of the first aspect.

Embodiment According To The Third Aspect

Figure 8:
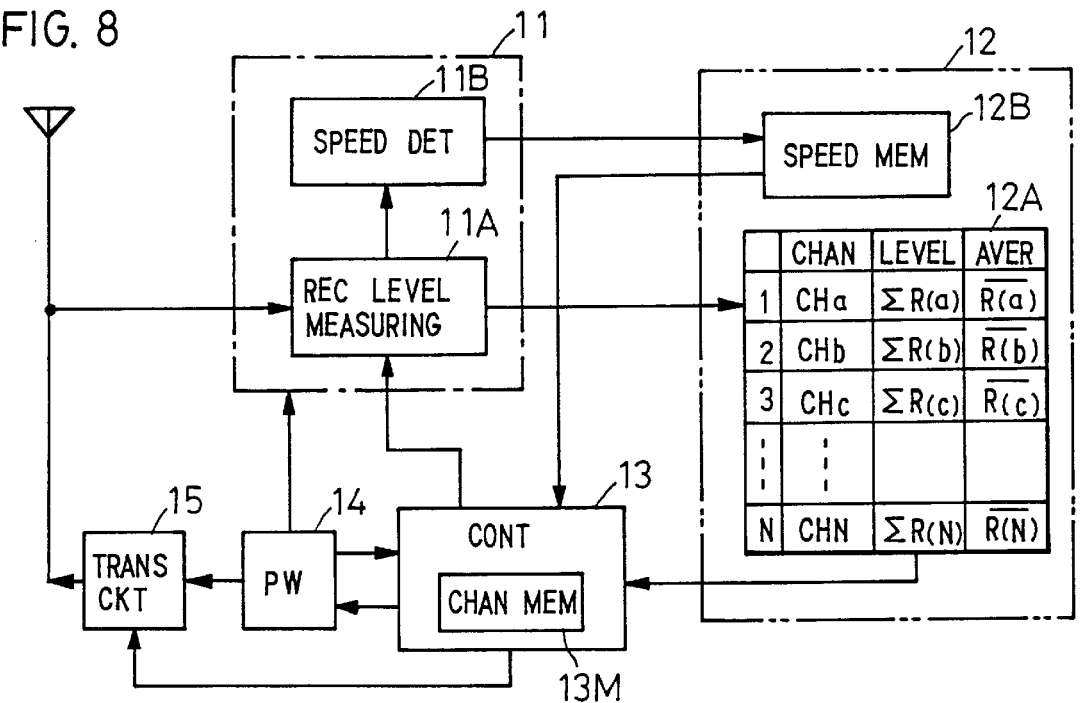
FIG. 8 is a block diagram showing the process and the data storage part required in the present invention.

In the embodiment of the third aspect of the present invention, the power consumption is reduced by measuring the moving speed of the mobile station, deciding if the moving speed is slower than a predetermined value, and setting the longer measuring intervals for a plurality of control channels when the moving speed is slower than the predetermined value compared with the case where the moving speed is faster. FIG. 8 shows a configuration example of a mobile station for implementing the method of the third aspect. The same reference numerals are assigned to the portions corresponding to those in FIG. 3. As shown in FIG. 8, a moving speed detection part 11B and a speed memory 12B are additionally provided on the mobile station. A receiving level measuring part 11A performs a measurement of the receiving levels of the control channels based on each frequency set by the control part 13 when a call waiting control channel is searched as explained in the first and second aspects or performs periodic measurements of the receiving levels of the call waiting control channel and the control channels of the peripheral cells when the mobile station is in the call waiting state. The measured receiving levels are stored in the receiving level memory 12A of the memory part 12 in correspondence to the respective channel numbers, as required basis. In a mobile station, the fading frequency of the receiving level almost corresponds to the moving speed of the mobile station. In this embodiment, the measured receiving level of the call waiting channel is provided to the moving speed detection part 11B, where the fading frequency is detected at equal intervals, independently of the processing for dividing cell-switching, as a value corresponding to the moving speed. The detected fading frequency is written into the speed memory 12B. If the fading frequency read out from the speed memory 12B is less than a predetermined value, the control part 13 sets the repetition period of the measurement of receiving level longer.

In the speed determination process by the control part 13, the speed is determined as high speed when, for example, the fading frequency is equal to or higher than 20 Hz and is determined as low speed when the fading frequency is lower than 20 Hz. For specific method for detecting a fading frequency, as shown in the Japanese Patent Application laid open No. 3-104330, for example, the amplitude envelope of the receiving level of the call waiting control channel is detected in the moving speed detection part 11B. The amplitude envelope is converted to a binary value based on whether or not the amplitude envelope is equal to or greater than a predetermined value. The number of pulses of the binary output within a predetermined time period is counted and the counted value is the value corresponding to the fading frequency, i.e., the value corresponding to the moving speed of the mobile station. This counted value is written into the speed memory 12B. If the fading frequency is equal to or greater than the predetermined value, the control part 13 determines that the moving speed of the mobile station is high. If the fading frequency is less than the predetermined value, the moving speed of the mobile station is determined as low.

Next, the receiving level measuring process and the cell switching determination process which are the important portions of the method of the third aspect of the present invention will be explained referring to FIG. 9.

First, in step S1, time $T_1$ is set to a first timer $t_1$. In step S2, the first timer $t_1$ is started and then in step S3, measurement of the receiving level of the call waiting control channel and measurement of each receiving level of the control channel of each peripheral cell specified by the information in the call waiting control channel are started. In step S4, the measured receiving level is accumulated in the memory area corresponding to the measured channel in the receiving level memory 12A. Also, the receiving level of the call waiting channel is given to the speed detection part 11B. In step S5, a check is made to see if all the measurements of the receiving levels of these control channels are completed. If completed, in step S6, the moving speed (fading frequency) stored in the speed memory 12B is compared with a predetermined value. If the moving speed is decided as high speed, the process immediately moves to step S7. If the moving speed is decided as low speed, a second timer $t_2$ is started in step S8 while the receiving level measurement of the control channels is refrained. In step S9, when the second timer $t_2$ is up, the process moves to step S7. The preset time $T_1$ of the first timer $t_1$ is, for example, 15 seconds and the preset time $\Delta T$ of the second timer $t_2$ is, for example, approximately 50 ms.

In step S7, a check is made to see if the first timer $t_1$ is up, and if not, the process returns to step S3 to measure the receiving level of each control channel again. If the first timer $t_1$ is up, the process moves to step S10. In step S10, an average receiving level is obtained by dividing the accumulated level value of each channel in the receiving level memory 12A by the number of accumulations. In step Sll, the control part 13 in FIG. 8 compares the value of the average receiving level of the call waiting control channel plus a predetermined value with each of the average receiving levels of the control channels of the peripheral cells. If any one of the average receiving level of the control channel of the peripheral cell is not greater than the average receiving level of the call waiting control channel plus the predetermined value, the process returns to step S1 to repeat the aforementioned process. If any one of the average level of the control channel of the peripheral cell is greater than the average receiving level of the call waiting control channel plus the predetermined value, a cell switching process is performed in step S12 and the process returns to step S1.

Figure 10A:
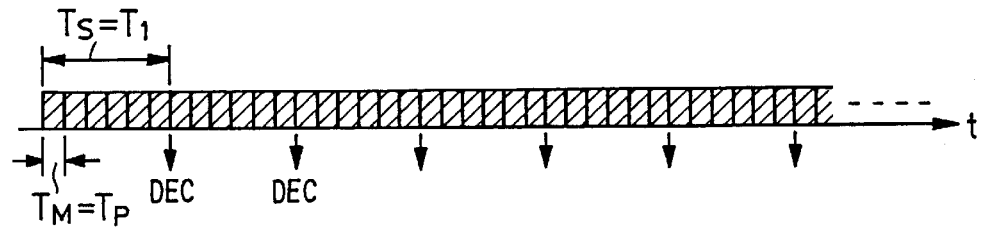
FIG. 10A shows a receiving level measuring period and a cell switching decision period in a high speed moving state in the present invention and also shows a receiving level measuring period and a cell switching decision period in the conventional system.

Since the process is performed in such a way, if the fading frequency is high, i.e., if the moving speed is high, as shown in FIG. 10A, when the receiving level measurement for all the control channels required to be measured is completed, the receiving level measurement for these control channels are immediately started again. The time $T_M$ required for measuring the receiving levels once for all the control channels to be measured becomes a measurement repetition period $T_P$. In such a way, the measurement of the receiving levels is continuously repeated and when the first timer $t_1$ is up, a check is performed to see if the processing for cell switching is necessary. Namely, the repetition period $T_S$ of the cell switching decision becomes $T_1$. This is the same as the conventional repetition period of receiving level measurement and cell switching.

Figure 10B:
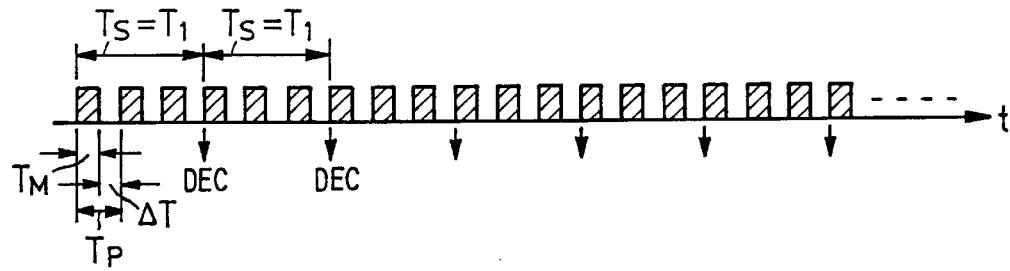
FIG. 10B shows a receiving level measuring period and a cell switching decision period in a low speed moving state in the present invention.

If the fading frequency is low, i.e., if the moving speed is slow, when the receiving level measurement for all the control channels required to be measured is completed, the receiving level measurement is started again after the preset time $\Delta T$ of the second timer $t_2$ is up. In this case, as shown in FIG. 10B, the receiving level measuring period $T_P$ is $T_P = T_M + \Delta T$. $\Delta T$ is selected so that the measuring period $T_P$ is shorter than the deciding period $T_S$, desirably $T_P < T_S/2$. The deciding period $T_S$ of the cell switching is same as $T_1$ of FIG. 10A. In such a way, since the receiving level measurement is performed intermittently, the power consumption required for the measurement is reduced. Although the number of measured receiving levels used in a cell switching deciding process is less than the case of FIG. 10A, the reliability is not much deteriorated because of the slow variation in speed of the receiving level.

Figure 11:
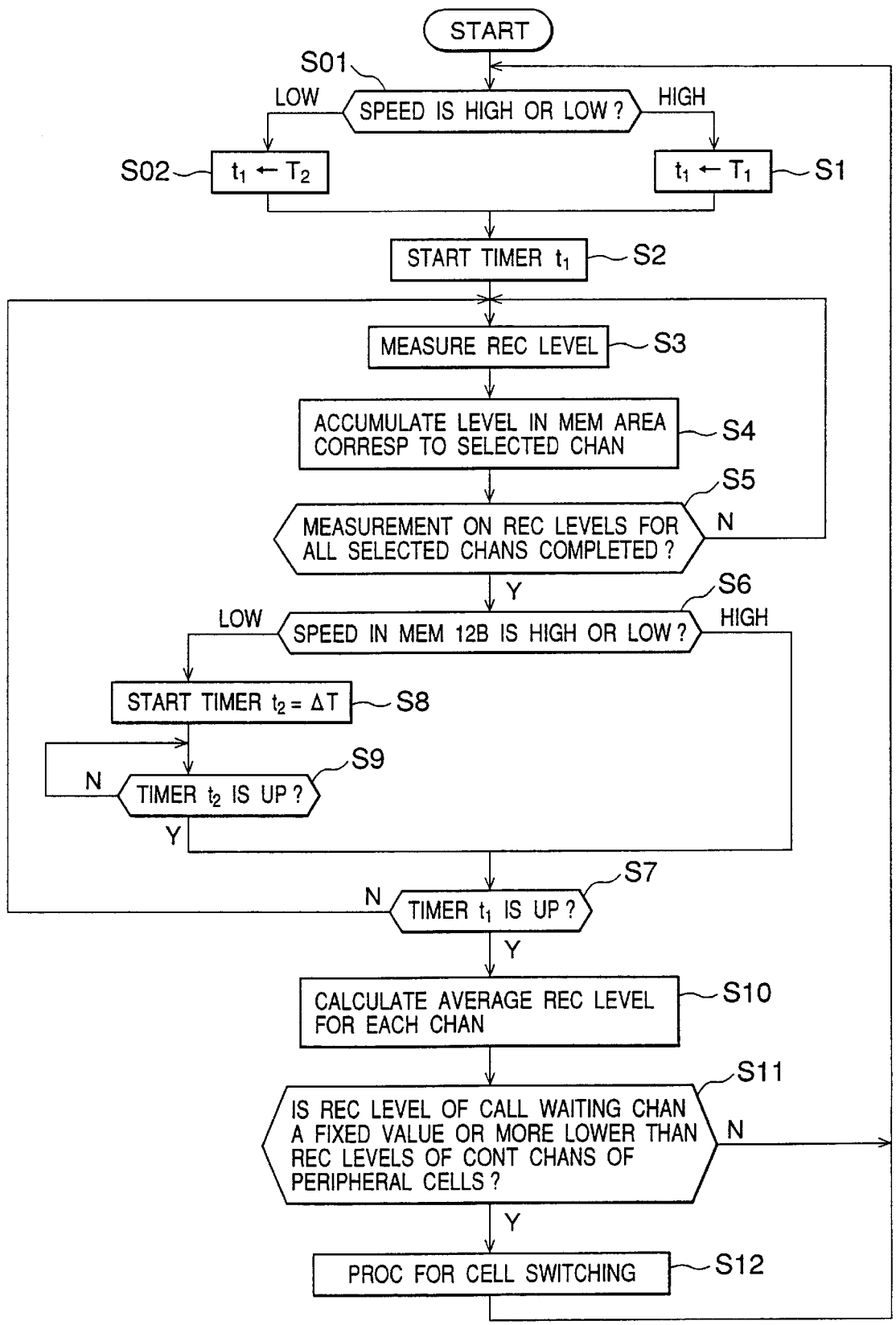
FIG. 11 is a flow chart showing another example for implementing a control channel searching method in accordance with the third aspect of the present invention.

However, low fading frequency does not necessarily mean small change in receiving level change. If number of measurements is reduced for obtaining average values of the receiving levels in a constant time period, the average receiving levels are easily influenced by a large instantaneous change in the receiving level and the possibility for the reduced accuracy becomes high. Therefore, highly reliable receiving level information can be obtained by the longer deciding period $T_S$ for cell switching. This embodiment is shown in FIG. 11 and the same reference symbols are assigned to the steps corresponding to those in FIG. 9. Namely, in this embodiment, when the process for each measuring period $T_1$ is started, in step 01, the moving speed stored in the speed memory 12B is checked to see if the speed is high or low. If high speed, in step S1, time $T_1$ is preset to the first timer $t_1$ and the process moves to step S2. If low speed, in step S02, a measuring period $T_2$ which is longer than $T_1$ is preset to the first timer $t_1$ and the process moves to step S2. The other processes are identical to those in the case of FIG. 9. For example, $T_1$ is approximately 15 seconds and $T_2$ is approximately 3 minutes.

Figure 10C:
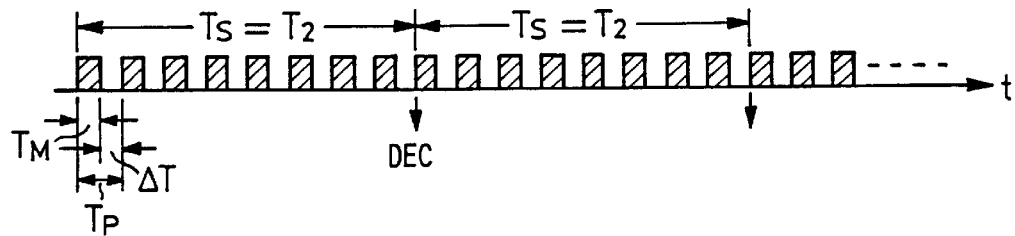
FIG. 10C shows a receiving level measuring period and a cell switching decision period in a low speed moving state in the present invention.
Figure 9:
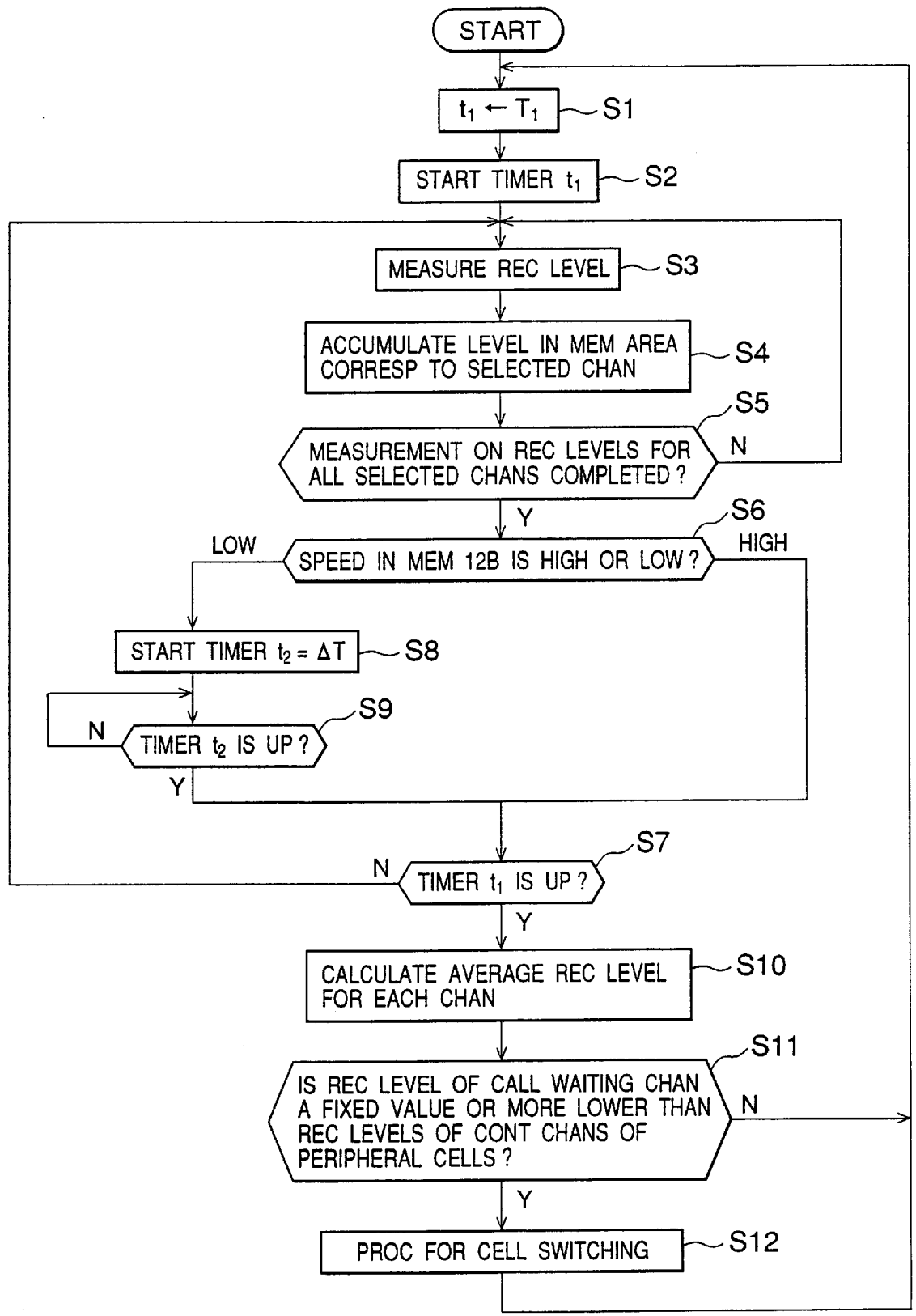
FIG. 9 is a flow chart for implementing the control channel searching method in accordance with the third aspect of the present invention.

Therefore, if the fading frequency is high and the moving speed is high, the process is the same as the case of FIG. 9. In this case, as shown in FIG. 10A, the measuring period is $T_P=T_M$ and the cell switching decision period is $T_S=T_1$. However, if the fading frequency is low and the moving speed is slow, $T_2$ is set to the first timer $t_1$. Therefore, as shown in FIG. 10C, the cell switching decision period $T_S$ is $T_2$, and thus the period is longer than the high speed case. Therefore, more receiving levels can be used for the cell switching decision, the average receiving level is sufficiently represented even in the longer fading period, highly reliable receiving level information can be obtained, and thus the cell switching decision can accurately be performed accordingly.

In the above process, the fading frequency is categorized into two levels "high" or "low", and corresponding to these two levels, the measuring period $T_P$ and the cell switching decision period $T_S$ are changed in two levels, respectively. The fading frequency can also be categorized into three or more levels. In such a case, the measuring period $T_P$ and cell switching decision period $T_S$ may be changed in three or more levels, respectively, in correspondence in three or more fading frequency levels. In addition, instead of detecting the fading frequency, the moving speed of the mobile station can be directly measured to change the $T_P$ and $T_S$ in response to the speed. In the case of a car telephone, the speed can be detected by the speed detector installed on the car. In the case of a portable telephone, a speed detector may be installed in the portable telephone. In the embodiments shown in FIGS. 9 and 11, an average value of the receiving levels for each control channel is obtained in every time period $T_S$. However, decision of propriety for call waiting can be done using a running average of the predetermined number of receiving levels in the predetermined time interval longer than $T_S$ for every period $T_S$ going back to the past from that point in time.

In FIG. 9, the period $T_1$ for deciding propriety for call waiting is determined by setting the time $T_1$ to the timer $t_1$ in step S1. However, for example, when a series of the receiving level measurements in steps S3–S5 is repeated predetermined number of times for the call waiting control channel and the control channels of the peripheral cells, it may be assumed that time $T_1$ is up. In this case, a predetermined repeat number H is set as $t_1$ in step S2. At immediately before step S6 or at the immediately before step S7, t, is decremented by 1 and when $t_1$ is 0 in step S7, it is decided that time $T_1$ is up. In the similar manner, in the embodiment of FIG. 11, the time periods $T_1$ and $T_2$ for deciding propriety for call waiting may be defined respectively by the predetermined repeat numbers H1 and H2 of the receiving level measurements and the completion of the period $T_1$ or $T_2$ may be decided by counting the number of repeat times of the measurements.

As described above, in the embodiment of the third aspect of the present invention, the moving speed of a mobile station is detected. If the moving speed is slower than a predetermined value, non-measuring time period is increased to reduce the power consumption by intermittently measuring the receiving levels of the peripheral control channels. In this case, highly reliable receiving level information can be obtained by making the cell switching decision period longer, and the cell switching decision and the cell switching control can be performed accurately.

We claim:

1. A control channel searching method which a mobile station in call waiting state performs, wherein a power supply for a receiving circuit is turned off during a break time of receiving level measurements, comprising steps of:

(a) measuring the receiving levels of a call waiting control channel and control channels of peripheral cells for every first time period;

(b) obtaining a speed value corresponding to a moving speed of said mobile station;

(c) checking to see if said speed value is smaller than a predetermined constant value;

(d) inserting a break time for receiving level measurements by changing said first time period to a time period longer than that when said speed value is smaller than said constant value; and (e) performing cell switching decision for every said second time period based on the measured receiving levels by checking to see if the receiving level of the control channel of the peripheral cell is predetermined value higher than the receiving level of said call waiting control channel.

2. The method according to claim 1 wherein said second time period is longer in the case where said speed value is less than said predetermined value compared with the case where said speed value is equal to or greater than said predetermined value.

3. The method according to claim 2 wherein said step (b) detects the fading frequency of the receiving level of said call waiting control channel as said speed value.

4. The method according to claim 1 or 2 wherein said step (b) detects the moving speed of said mobile station as said speed value.

5. The method according to claim 1 or 2 wherein the cell switching decision of said step (e) is performed based on the average receiving level of the receiving levels measured in every said first time period of said step (a) repeated within said second time period.

6. The method according to claim 1 or 2 wherein the cell switching decision of said step (e) is performed based on the running average of said receiving levels by said step (a) in a predetermined time period longer than said second time period going back to the past.

7. The method according to claim 1 wherein said second time period is a predetermined time length.

8. The method according to claim 1 wherein said second time period is a predetermined number of repeat times of the measurement of said step (a).

* * * * *